United States Patent [19]

Schippers et al.

[11] E Patent Number: Re. 31,839

[45] Reissued Date of Patent: Feb. 26, 1985

[54] BOBBIN TRANSPORT APPARATUS AND METHOD

[75] Inventors: Heinz Schippers; Gerd Muennekehoff, both of Remscheid; Udo Teich, Sprochhoevel, all of Fed. Rep. of Germany

[73] Assignee: Barmag Barmer Maschinenfabrik AG, Remscheid, Fed. Rep. of Germany

[21] Appl. No.: 536,898

[22] Filed: Sep. 28, 1983

Related U.S. Patent Documents

Reissue of:

[64] Patent No.: 4,351,494
Issued: Sep. 28, 1982
Appl. No.: 191,349
Filed: Sep. 26, 1980

[30] Foreign Application Priority Data

Sep. 29, 1979 [DE] Fed. Rep. of Germany ..... 2939675
Nov. 14, 1979 [DE] Fed. Rep. of Germany ..... 2945861

[51] Int. Cl.[3] ..... B65H 54/26

[52] U.S. Cl. ..... 242/35.5 A; 57/265; 57/270; 57/281; 73/432 R; 242/36

[58] Field of Search ..... 242/35.5 A, 35.5 R, 242/18 R, 36, 41; 57/265, 270, 281; 73/73, 74, 75, 76, 432 R; 177/2, 3, 4, 5, 10, 13, 25, 52, 60, 61, 59, 145, 148; 364/550, 551, 552, 555, 556, 558, 560, 563, 567; 28/201, 208, 284; 33/127, 128, 169, 172 F

[56] References Cited

U.S. PATENT DOCUMENTS

| | | | |
|---|---|---|---|
| 813,027 | 2/1906 | Talbert | 177/61 X |
| 2,020,982 | 11/1935 | Williams | 177/10 X |
| 2,882,035 | 4/1959 | Lauler et al. | 177/10 |
| 3,195,298 | 7/1965 | Furst | 242/35.5 R |
| 3,505,530 | 4/1970 | Reynolds et al. . | |
| 3,811,631 | 5/1974 | Mayer et al. | 242/35.5 A |
| 3,820,730 | 6/1974 | Endo et al. | 242/35.5 A |
| 3,895,725 | 7/1975 | Mayer | 242/35.5 A |
| 3,913,743 | 10/1975 | Nelson . | |
| 3,955,637 | 5/1976 | Del Rosso | 177/52 X |
| 3,987,974 | 10/1976 | Mayer | 242/35.5 A |
| 3,991,375 | 11/1976 | Riggs et al. | 73/73 X |
| 4,024,380 | 5/1977 | Gunn | 177/5 X |
| 4,101,366 | 7/1978 | Teraoka et al. | 177/5 |
| 4,138,072 | 2/1979 | Aoyama et al. | 242/35.5 A |
| 4,153,211 | 5/1979 | Lenk et al. | 242/35.5 A |

FOREIGN PATENT DOCUMENTS

| | | |
|---|---|---|
| 2149573 | 10/1971 | Fed. Rep. of Germany . |
| 2744287 | 9/1978 | Fed. Rep. of Germany . |
| 1460974 | 11/1965 | France . |
| 411654 | 5/1964 | Switzerland . |

*Primary Examiner*—Stanley N. Gilreath
*Attorney, Agent, or Firm*—Bell, Seltzer, Park & Gibson

[57] ABSTRACT

A bobbin transport apparatus and method is provided which is adapted for use with a textile yarn processing machine having a plurality of yarn winding stations along at least one side thereof. The transport apparatus includes a movable carriage having a mandrel for receiving the full bobbins from the winding station of the processing machine, and quality control means for measuring a number of physical characteristics of each full bobbin received thereon. The quality control measurements may be performed concurrently with the transport of the bobbins to a remote creel, and the measurements are fed to a computer where an immediate determination is made as to whether the measured quality characteristics fall within accepted tolerance limits. The computer may also be employed to calculate additional quality control related characteristics, such as yarn denier and bobbin wind tightness, from the directly measured characteristics. The apparatus may further include a printer mounted on the carriage for printing the measured or calculated quality characteristics on a label or directly onto each bobbin.

29 Claims, 11 Drawing Figures

BOBBIN TRANSPORT APPARATUS AND METHOD

Matter enclosed in heavy brackets [ ] appears in the original patent but forms no part of this reissue specification; matter printed in italics indicates the additions made by reissue.

The present invention relates to an apparatus and method for the efficient quality control of continuous web-shaped or ribbon-shaped strands, filamentary materials, yarns, or the like, all being hereinafter referred to as "yarns".

The determination of the denier, weight, liquid application, etc. of yarns for quality control purposes is not only technically expensive, but also this quality control provides measured values which are not always representative of the total product due to the length of the yarns.

In addition, the quality control of yarns which are wound into bobbins is time consuming in that it involves a separate working step, and the results are obtained too late to be able to effect a punctual quality correction by intervention in the production or processing method of the yarns.

Still further, the quality control of finished bobbins also interferes in the production process since the bobbins to be examined must be removed from the production process for further processing and packing. For this reason, a random quality control sampling of the full bobbins is conventional in the industry at the present time. Consequently, qualitatively inferior bobbins may proceed to further processing between the sampling intervals.

It is an object of the present invention to provide a novel quality control apparatus and method which insures that only a slight and acceptable quantity of defective material is produced until correction of the production or processing method is made. Furthermore, the technical and labor expense of the quality control is reduced to such an extent that a control of each winding bobbin is possible.

The solution in accordance with the present invention involves the full bobbins being transferred to a bobbin transport apparatus, which includes devices for the quality control, whereby the coordination between the bobbins and the particular winding stations on which the bobbins have been produced is maintained.

It is a further advantage of the present invention that the quality control is part of the production process of the bobbins, which also includes their transport. Thus, a mechanical auxiliary device in the form of the bobbin transport apparatus is simultaneously available to transport the heavy bobbins.

For the above reasons, the present invention is particularly useful in the quality control of freshly-spun and optionally drawn synthetic fibers, as synthetic fibers of this type are wound into very large and heavy bobbins weighing more than 30 kg, and involve long bobbin winding times. The bobbin transport apparatus may be positioned to receive the bobbins from one, or from each of a plurality of winding stations.

A primary basis of the quality control according to the present invention, involves the measurement of the quantity of the material wound onto the bobbin. For this reason, the bobbin transport apparatus preferably comprises devices for weighing the bobbin or bobbins which have been transferred onto the apparatus.

Another important measured characteristic is the bobbin diameter which is used particularly for determining the bobbin wind tightness, but also, particularly for bobbins on which web-like strands, such as sheet webs have been wound, the measured diameter may be used for determining the quantity of the material stored on the bobbin. A preferred embodiment of the invention therefore includes a scanning device for measuring the diameter of the bobbin.

With synthetic fibers and particularly freshly-spun synthetic fibers, another important quality feature is the so-called "preparation" application. In this case, "preparation" is understood to designate liquids which are applied onto the yarns during spinning to facilitate the spinning procedure, the drafting procedure, winding, and possibly also further processing.

Measuring the preparation application in accordance with this invention, may be effected either quantitatively or merely qualitatively, to insure that there has indeed been a preparation application. For measuring the preparation application, devices are available, for example, which comprise two electrodes which are pressed at a specified spacing and with a certain force onto the bobbin surface, or pressed as needles into the bobbin, and the electrical conductance of the bobbin is then measured using a suitable ohmmeter.

The quality measuring may also relate to the characteristics of the bobbin itself, particularly those characteristics which point to the unwinding characteristics of wound thread. In this case, the optical, pneumatic or mechanical scanning of the bobbin circumferential surface and bobbin front is possible for detecting mirror formations (superimposed layers), sloughs (thread curves protruding from the front surfaces), thickenings, and similar winding defects.

According to the present invention, the bobbin transport apparatus which carries devices for the quality control, may be manually loaded with the winding bobbins from one or a pre-given number of winding stations. However, it is also possible to design the bobbin transport apparatus as an automatic bobbin changing device which automatically and successively receives the bobbins from one or more winding stations. An automatic bobbin changing device of this type is advantageously used particularly in the case of multiposition textile winding machines. In this case, the automatic bobbin changing device may be moved along the front of the multi-position textile machine and may be positioned in front of each winding station for the mechanically effected receipt of the full bobbins produced at the winding station. After receiving the full bobbins from one winding station or, if the automatic bobbin changing device has a larger transport capacity, from several winding stations, the apparatus may be moved along the front of the machine to transport the bobbins to a creel, or to a location for packing or further processing.

The use of a computer permits the evaluation of the quality measuring data for establishing further quality characteristics.

The method according to the invention preferably permits the determination of the thread denier while the thread is on the bobbin, which is particularly useful in spinning machines for synthetic fibers, as the denier of the synthetic fibers depends on a large number of individual parameters, including viscosity, take-off velocity, drawing velocity and filament number. According to the present method, the thread velocity, winding cycle time of the bobbin, and the bobbin weight, are ascertained by the bobbin transport apparatus annd are recorded by the computer, and the denier is calculated from these values by calculating the quotient as follows:

Denier = weight/(thread velocity × duration of bobbin wind)

The duration of the bobbin wind of each winding station may be pre-given as constant, e.g. by using a timer. However, it is also possible to disconnect each winding station dependent on reaching a diameter which has been calculated, and to measure the duration of the bobbin wind and to feed this measured time into the computer.

In order to determine the absolute weight of the yarn quantity stored on the bobbin, the weights of the bobbin tubes may be fed into the computer. This may be effected, for example, by positioning a weighing device for the individual bobbin tubes on an automatic bobbin changing device, which mechanically or automatically conveys the empty tubes to each winding station, and the automatic bobbin changing device then feeds the measuring results and the associated winding station into the memory of the computer. Insofar as the bobbin weights do not substantially differ from each other, the tube weight may also be fed manually into the memory of the microprocessor. Identical tube weights for a plurality of tubes may be achieved by a precise production and/or sorting.

It is also possible to feed the preparation application determined in the bobbin transport apparatus into the computer, as a correction for the denier determination. The bobbin wind tightness may be calculated by correlating the diameter and weight.

The quality control may result in a quality documentation being provided for each bobbin. For this reason, it is also suggested according to the preferred embodiment of the present invention that the quality control devices are connected to a printing device to print out the measured or calculated quality characteristics. The printed matter may be a list, with the individual bobbins being associated with the printed results by a definite numbering system.

The printing device may also be arranged such that the printed results are provided on each bobbin, and specifically particularly on each bobbin tube. In this case, the printing device is positioned on the bobbin transport apparatus. It may also be provided that the printing device prints out labels, which are affixed to the individual bobbins or their tubes.

By allocating the established quality values to each bobbin, it is insured that each bobbin has documented quality characteristics. Thus the continued production of bobbins having inferior quality is avoided. This increases the utility value and the marketing value of the bobbins which have been produced, whose quality up until now has been guaranteed only by statistically determined minimum and maximum deviations from pre-given quality parameters.

The signifance of the present quality control apparatus and method is also to be found in the ability to promptly interrupt the production or processing method of the yarns, to thereby limit the productions of inferior material having excessive deviation from the pre-given quality parameters.

It is also preferably provided that the bobbin transport apparatus and the quality measuring devices positioned thereon are connected to a data processing unit with a memory and computer for the quality evaluation. The data processing unit takes the measured values of the quality control, and also other necessary parameters, into its memory and processes them in the course of the quality evaluation into important quality characteristics, e.g., denier and bobbin wind tightness among others. The use of a computer with a memory also allows the evaluation of the measured values and the determined quality characteristics. Thereby averages may be calculated, which may then be used as a presetting for the operation of the individual winding stations.

The data processing unit may also be used for the control of the textile machine. Such control may involve the direct control of the winding stations, e.g. by a disconnection signal, adjustment of the spinning pumps, or preparation pump speeds. Further, the control may involve the release of optical or acoustic warning signals for the operators, as well as the display of measured characteristic or error sources. For this purpose, the data processing unit is connected for its part to the individual winding stations, and is programmed to release switching commands dependent on the measured values received from the bobbin transport apparatus and the quality characteristics established in the data processing unit. The term "data processing unit" is understood in this case in its broadest sense and includes one or more memories and computers. It may particularly involve microprocessors, which may be associated respectively with the bobbin transport apparatus and each textile machine, and may be interconnected by a central unit. Therefore, it is possible for example to disconnect the individual winding station or to correct an individual machine parameters (e.g. pump speed), when a measured value or a calculated characteristic differs by more than a permissible tolerance range from a preselected control value or from a calculated average of the measured values or characteristics. An advantageous use of the invention involves each winding station being process-controlled and also dependent on the measured characteristics determined for the remaining winding stations.

It is also possible when using a computer to operate the quality measuring devices without any precise calibration and to only monitor the timewise constancy and accuracy of the operation conditions, and also the constancy and accuracy of the operating conditions of one winding station to another.

The denier which has been determined may also be used according to the invention to intervene in the spinning process, in that the computer may produce a warning or disconnection signal for the individual winding station where there is an inadmissible deviation of the denier, calculated for the individual bobbin, from a previously established average or a preselected denier value or from the denier value of the other winding stations.

The invention, particularly as far as it is related to an automatic bobbin changing apparatus, permits a continuous quality control of the bobbins and winding stations with a minimum technical and labor expense, since only one quality control measuring unit is required for a plurality of winding stations, and since the quality control may be effected during the transport or movement of the bobbin transport apparatus.

Some of the objects and advantages of the invention having been stated, others will appear as the description proceeds, when taken in connection with the accompanying drawings, in which FIG. 1 is a schematic top plan view of a textile winding machine which includes a bobbin transport apparatus in accordance with the present invention;

Figure 1:
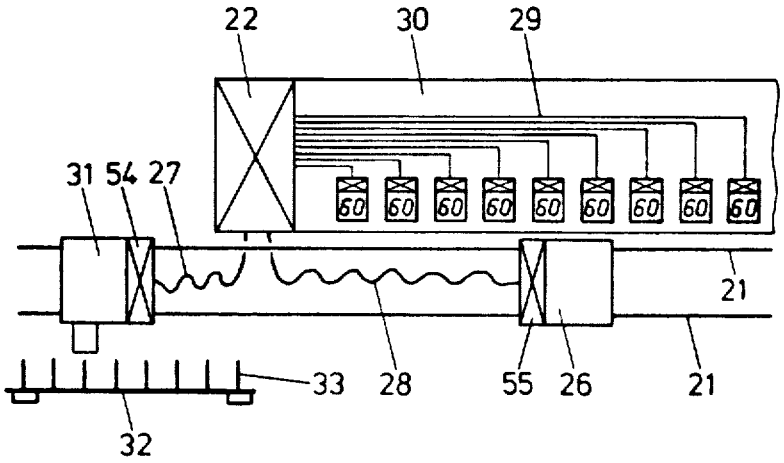

Referring more specifically to the drawings, FIG. 1 schematically illustrates the mutual cooperation of a spinning machine 30 for synthetic fibers and having a plurality of individual winding stations 60, with the data processing unit or microprocessor 22, the thread operating carriage 26, the bobbin doffing carriage 31, and the bobbin transport creel 32. The term "bobbin doffing carriage" characterizes its function as an automatic bobbin changing device. It is also used for the bobbin transport and is thereby also characterized herein as a bobbin transport apparatus.

It may be seen that the thread operating carriage and the bobbin doffing carriage 31 may be operated independently of each other and are connected to the microprocessor 22 by flexible tow lines 28 and 27 respectively. On the other side, the microprocessor 22 is connected by lines 29 to the individual winding stations 60, so that the microprocessor takes over the central control of the winding heads, the thread operating carriage, and the bobbin doffing carriage. The thread operating carriage and bobbin doffing carriage may be moved on rails 21 along the front of the machine by suitable self-contained drive units or the like (not shown). They are both provided with a subordinate microprocessor 55 and 54 respectively.

The creel 32 may be positioned at any point along the rail path 21. Due to the fact that the operational function of the bobbin change is associated with the thread operating carriage 26, the bobbin doffing carriage 31 is available for the bobbin transport between the individual winding heads 60 and the creel 32.

The cooperation of the textile machine 30 with the winding heads 60, the thread operating carriage 26, and bobbin doffing carriage 31 for changing the bobbins is described in U.S. application Ser. No. 191,350 entitled BOBBIN CHANGING APPARATUS, and filed concurrently herewith. Attention is directed to this application for additional details concerning the bobbin changing functions.

Figure 2A:
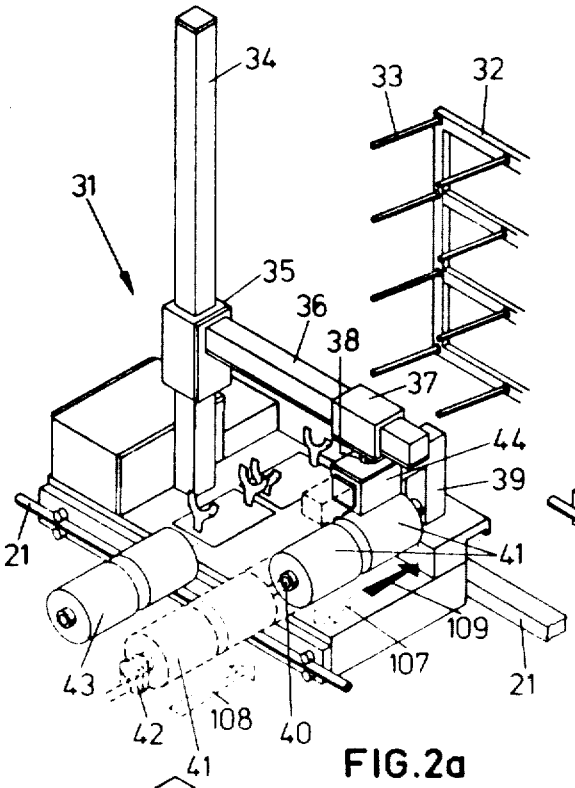
FIGS. 2a through 2d are perspective views of a bobbin transport apparatus in accordance with the present invention, and shown in several phases of its operation.

The bobbin doffing carriage 31 will be initially described with reference to FIGS. 2a to 2d. As indicated above, the doffing carriage 31 may be moved on the rails 21 by a suitable self-contained drive unit or the like (not shown). On a base plate, the carriage 31 has a vertical column 34. A slide 35 is slideably supported on the column 34, and an extension arm 36 is fixed to the slide 35. A trolley 37 includes a pivoting axle 38 which is parallel to the column 34, on which is mounted a sliding block 44. A U-shaped supporting bracket 39 which includes the receiving mandrel 40, is movable in the sliding block 44 in the plane of the U. The associated drive devices are not shown here in detail, however, it is evident from the drawings that the mandrel 40 may be moved horizontally in both the direction of the extension arm 36 and the direction of the axis of the mandrel 40, and may also perform a pivoting movement about the axle 38. A creel 32 is also illustrated which comprises several creeling pins 33. Furthermore, FIG. 2a shows the full bobbins 41, 43 located on the mounting spindles of two winding heads having pushout devices 42, with the bobbins 43 still being wound. The full bobbins 41 which are shown in dashed lines are no longer being wound, and are lined up for their bobbin change. A full bobbin in the sense of this application is any bobbin containing wound yarn material which has finished its bobbin wind cycle, regardless of whether the intended quantity of yarn has been wound or whether the bobbin wind cycle has been prematurely interrupted e.g. due to a thread break or other disturbance.

A push-out device 45 is mounted on each receiving mandrel 40 of the bobbin doffing carriage, which push-out device slides on the receiving mandrel and catches behind the tubes of the full bobbin package 41.

Figure 3:
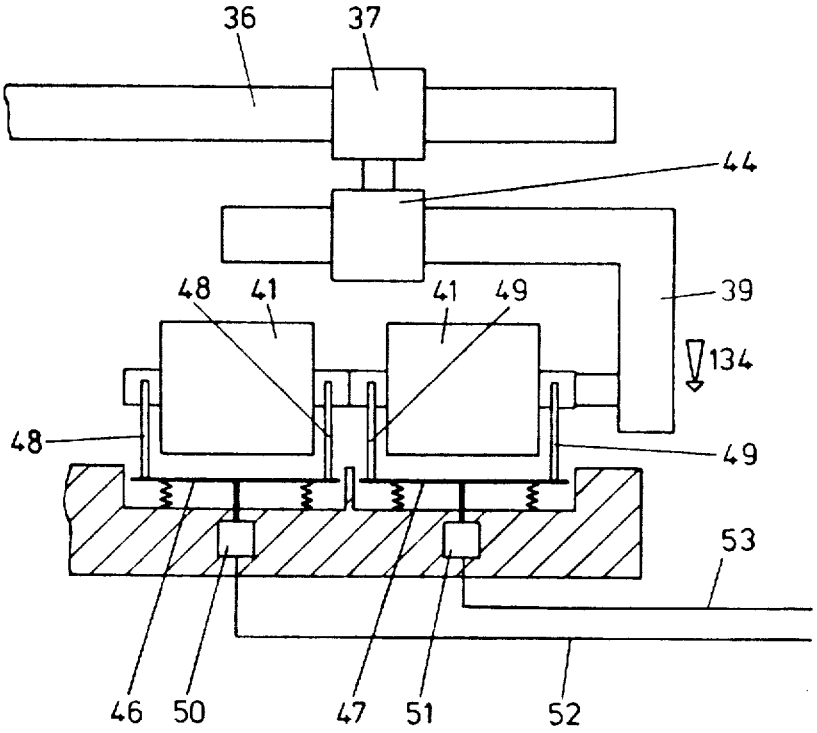
FIG. 3 is a fragmentary, partially schematic view of a bobbin transport apparatus with a weighing device in accordance with the present invention.

FIG. 3 schematically illustrates a portion of the bobbin doffing carriage, and in particular illustrates a weighing device for the full bobbin 41. For this purpose, the spring-mounted weighing plates 46, 47 are provided on the base plate of the doffing carriage and the plates are connected to the sensing devices 50, 51 and lines 52, 53 which connect to the microprocessor. Aligned fork-like cradles 48, 49 are located on the weighing plates 46, 47 which cradles are sized such that they catch respectively the tube ends of each of the bobbins 41.

Figure 2B:
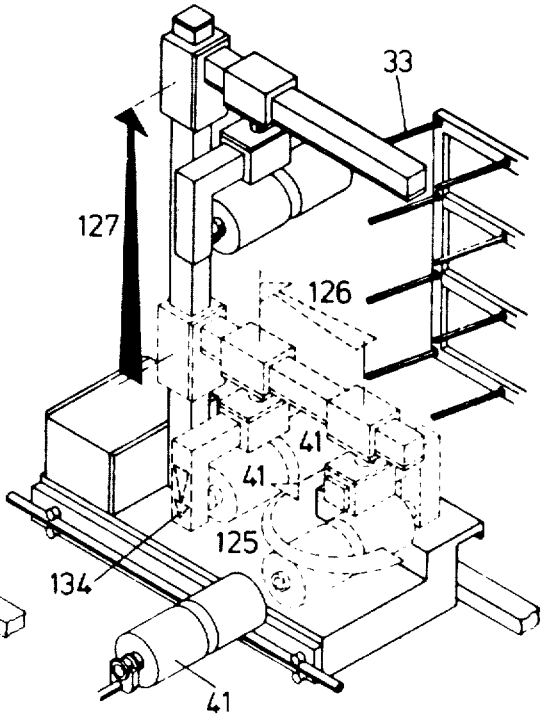
Figure 2C:
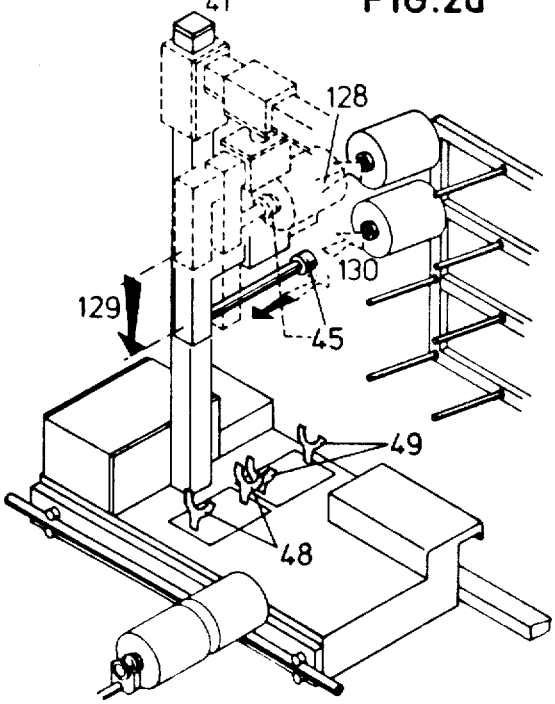
Figure 2D:
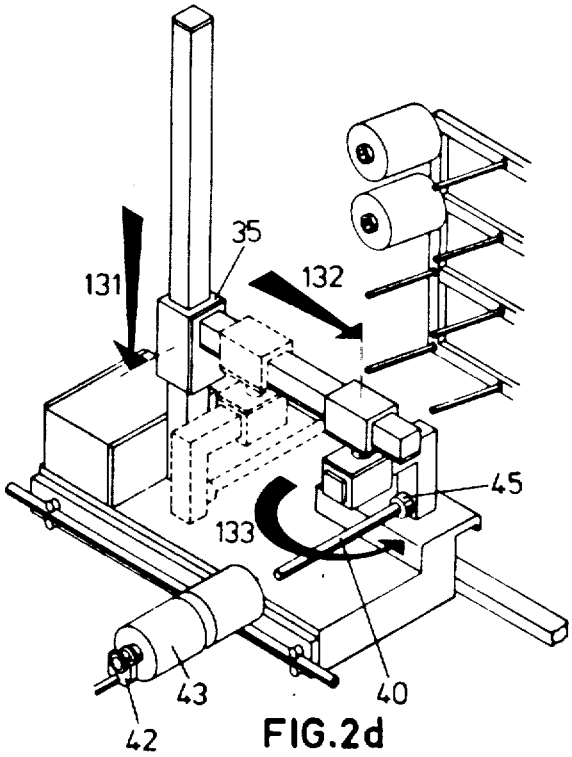

By a lowering movement 134 of the receiving mandrel 40, the full bobbins 41 located on the receiving mandrel are supported in the pairs of cradles 48, 49 and are weighed. The weighing results proceed to the microprocessor. It is also possible according to the invention to previously determine the empty tube weights, and to thus determine the exact yarn weight Y in the microprocessor. The weighing plates 46, 47 and the pairs of cradles 48, 49 are positioned such that the lowering movement 134 may be effected subsequently to the pivoting movement 125 (FIG. 2b). Weighing may easily take place during the journey of the doffing carriage between the winding station and the creel, i.e. without losing time.

Figure 4:
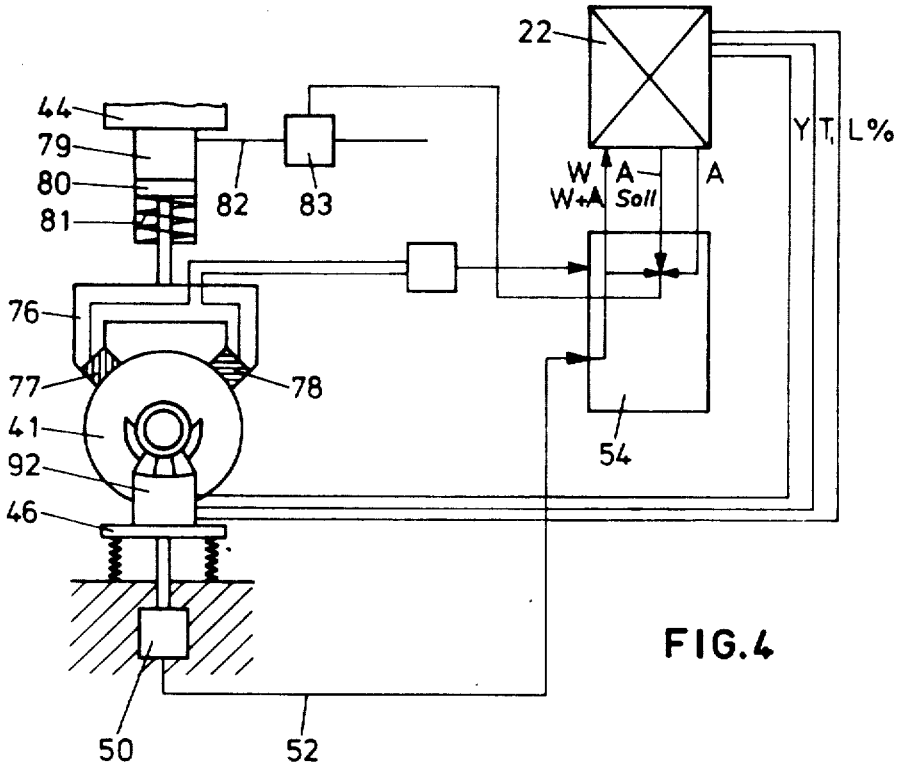
FIG. 4 is a fragmentary, partially schematic view of the bobbin transport apparatus, and illustrating the measuring device for determining the quantity of the preparation applied to the yarn of the bobbin.
Figure 5:
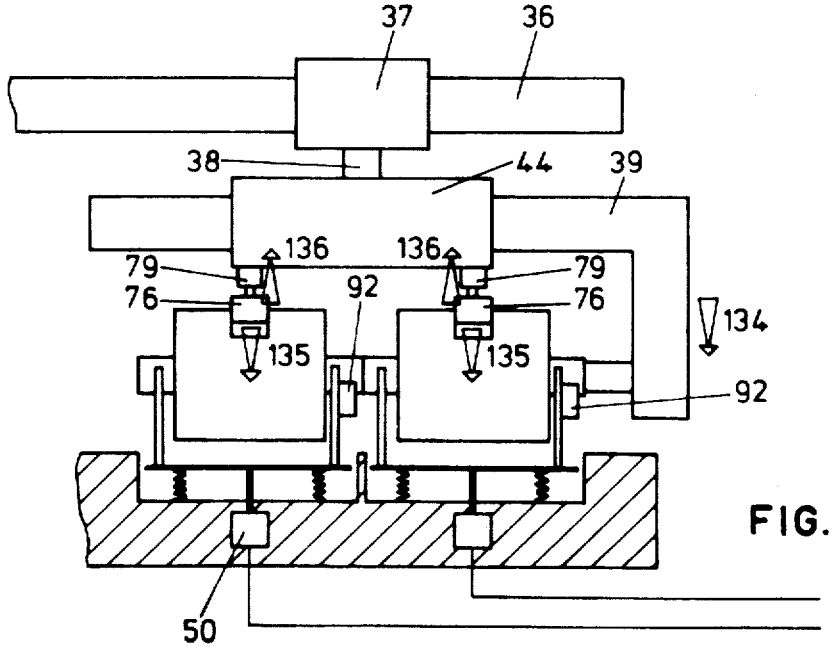
FIG. 5 is a view similar to FIG. 3 and further illustrating the measuring device for determining the preparation, as well as the printing apparatus.

FIGS. 4 and 5 show a device for measuring the liquid or preparation application and which is also preferably mounted on the bobbin doffing carriage. The yoke-shaped measuring head 76 comprises the two electrodes 77 and 78 which conform to the bobbin circumference which is normally produced on the winding machine. By designing the electrodes elastically, a close fit is produced on the bobbin surface. The measuring head 76 is attached to the sliding block 44 by a cylinder piston-unit 79, 80 which includes a spring 81 positioned as illustrated. The piston may be charged with compressed air via the pneumatic transformer 83 and pipe 82, and thereby the measuring head 76 may be lowered against the force of the spring 81. The internal microprocessor 54 associated with the bobbin doffing carriage is now programmed such that it initially records the weighing result of the bobbin 41 before the bobbin is charged with the contact pressure of the measuring head 76. This measuring result is stored in the memory of the external microprocessor 22 which is associated with the textile machine. The cylinder 79 is then charged with a pressure, the measuring head 76 is lowered in movement 135, and a renewed weighing signal (weight+contact pressure=W+A) is produced by the weighing device 46 and is passed on to the internal microprocessor 54. The internal microprocessor 54 simultaneously receives the value of the bobbin weight which is stored in the external microprocessor and forms the differential signal. The set value for the contact pressure is also stored in the external microprocessor 22. This value is also fed into the internal microprocessor 54, and, dependent thereon, the contact pressure is guided toward a pre-given value (labeled "Soll" in FIG. 4) via the pneumatic transformer 83 so that comparable measuring values are obtained from one bobbin to the next and it is possible to gauge the measuring head.

Figure 7:
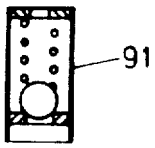
FIG. 7 is a fragmentary sectional view of the pressure relief valve for the diameter measuring device shown in FIG. 6.
Figure 6:
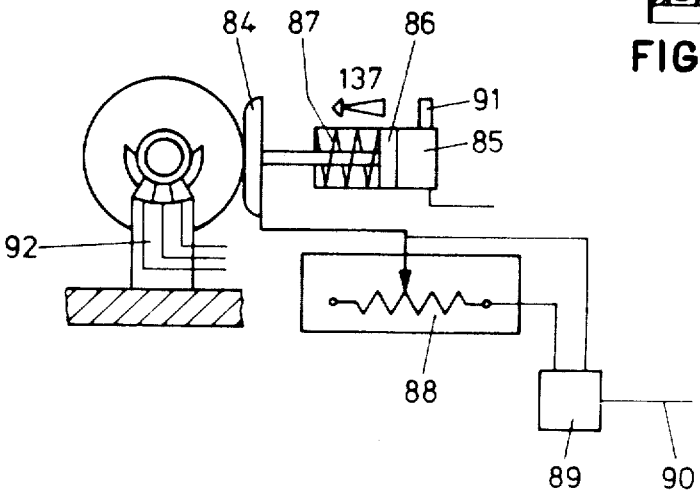
FIG. 6 is a schematic view of the measuring device for determining the diameter of the bobbin on the bobbin transport apparatus.

FIG. 6 shows a device for scanning the diameter of the bobbin, comprising a sensor plate 84 which is moved pneumatically to the circumference of the bobbin against spring 87 in movement 137 by means of the cylinder-piston-unit 85, 86. The measuring device includes a potentiometer 88 and transformer 89 which is gauged such that a signal representing the diamter or the radius of the bobbin is fed into the microprocessor via line 90. By means of a pressure relief valve 91 with a ball and back pressure spring (note also FIG. 7), it is ensured that a constant pressure is continuously exerted on the bobbin surface. It is evident that the bobbin wind tightness may also be determined with this device by a two-stage pressure charging.

The functional procedure for the bobbin doffing carriage 31 will now be described. As may be seen from FIG. 2a, the mandrel 40 is initially positioned in axial alignment with the mounting spindle, shown here by the full bobbins 41. The U-shaped bracket 39 is then moved in the sliding block 44 until the mandrel 40 is practically in contact with the front of the spindle (movement 107). The push-out device 42 is then activated in movement 108, as seen from FIG. 2a. Since the push-out device catches behind the tubes of the full bobbin packages 41, both full bobbin packages are pushed onto the bobbin receiving mandrel 40 of the doffing carriage. The U-shaped supporting bracket 39 now returns to its starting position in movement 109.

By movement 125, the U-shaped bracket 39 is next pivoted by 180° about the pivoting axle 38. The trolley 37 is then moved toward the column 34 in movement 126. The quality control functions now take place, being initiated by the lowering movement 134. By this lowering movement, the tubes of the full bobbins 41 as shown in FIG. 3, are positioned on the cradles 48, 49 of the weighing device such that the mandrel 40, which is smaller in diameter, no longer touches the larger interior diameter of the tubes of the bobbins 41. Thus, the total weight of the thread material with the tubes is initially determined and fed into the external microprocessor 22. The measuring heads 76 are then moved toward the bobbins in lowering movement 135 in the manner previously described, and a precise contact pressure is produced between the electrodes of the measuring head and the bobbins to measure the applied preparation.

The diameter or radius of the bobbin may now also be scanned by scanning movement 137 of the diameter sensor plate 84, and the result fed into the memory of the central microprocessor 22.

Subsequent to these measurements of the quality characteristics, which may be effected alternatively or cumulatively, the extension arm 36 may be raised by movement 127 (FIG. 2b) until the mandrel 40 is aligned with a specified pin 33 of the creel 32. If required, the U-shaped supporting bracket 39 may be moved in the sliding block in the direction of the pin. The push-out device 45, which is designed as an axially movable sleeve on the receiving mandrel 40, is activated in the axial direction, and as a result, the first bobbin is transferred onto the pin 33 by movement 128. The extension arm 36 and slide 35 are now lowered to the height of the next pin by movement 129 and the second bobbin is then transferred onto a separate pin of the creel by further advancing the push-out device 45 to effect movement 130.

The slide 35 is again returned to the height of the winding heads by movement 131. The trolley 37 returns into a position aligned with a winding device (movement 132), and the supporting bracket 39 is then pivoted about the pivoting axle 38 (movement 133). The movement procedure according to FIG. 2a may then restart with the forward movement 107 of the supporting bracket 39.

By correspondingly programming the microprocessor and by dividing the thread operating and doffing procedures, it is possible to position the bobbins on the creel such that a clear allocation is possible between the winding head on which the bobbin is produced, and the depositing point (pin 33) on the creel. As a result of this, the quality control functions and quality reliability are substantially facilitated.

It must be emphasized that the performance of the quality control measurements during the bobbin transport according to the invention permits the qualitative and quantitative characteristics to be associated with the product which is obtained, namely with the individual bobbins which are produced. This increases the market value of the products which are produced. Further, printing devices are also preferably provided according to the invention, in order to characterize the bobbins. These printing devices may print out lists which identify each bobbin with its quality values. Printing labels is also possible, which are then affixed to the bobbins. Alternatively, the labels may be affixed onto the bobbin tubes. In the last two mentioned cases, the printing device is advantageously positioned on the bobbin transport apparatus, i.e., carriage 31. An arrangement of this type is shown in FIGS. 4, 5 and 6. The printing device is indicated by reference numeral 92, and is associated with the receiving cradles of the weighing device so that it prints the tubes of the bobbins. The printing device comprises several printing segments which are connected to the memory of the microprocessor 22 via lines, which lines also deliver for example coded signals for the yarn weight Y, denier Dn, and the liquid preparation application L% and a characterization of the winding station.

It is also possible to actually use the measured values which are obtained for monitoring the machine, i.e. for the machine process control. For this reason, the term "quality control" is also understood in the sense of this application to designate the process control. This involves a correlation of the actual measured or calculated values with set values which are previously fed into the computer, or with timewise averages which are ascertained by the computer, or averages established by the computer for all winding stations. Furthermore, it is also possible for the purpose of directly controlling the process to produce the statistical quality statement for the entire textile machine and to thereby obtain reports concerning defects and the tendency towards defects, and also causes of defects of the individual winding stations. This applies particularly to the denier calculation, weight measurement, diameter measurement, measurement of the preparation quantity which is applied onto the yarn, and the wind tightness calculation. All these directly measured values, or values which are determined by computation, may be used by correspondingly programming the microprocessor in order to release warning signals or machine operating commands. If, for example, it is established by calculating the denier that yarns are produced of a too high or too low denier, which may be caused, for example, when individual filaments of the multifilament synthetic thread proceed to the wrong winding station, the winding step for the next bobbin may be immediately terminated and a warning signal may be given so that the defect may be corrected. By correspondingly correlating the bobbin weight and diameter, the bobbin wind tightness may be determined and thereby, an operating signal may also be released when the ratio of bobbin weight to bobbin diameter does not correspond to the values determined as being optimum or to the values which are established by the microprocessor as an average.

The method of allocating qualitative and quantitative values to the individual bobbins and winding stations is described in more detail with reference to the course diagram set forth in FIG. 8. The weight of the tubes w is fed as signal 1 into the memory of the external microprocessor. The tubes for the bobbins are wound for example from paper or cardboard, and since their weight is substantially contant, an individual weighing is generally unnecessary. However, it is also possible to fit the thread operating carriage 26, which performs the donning of the empty tubes according to U.S. application Ser. No. 191,350, with a weighing device for the empty tubes, and to store the actual tube weight based on the respective winding station in the memory of the external microprocessor.

Figure 8:
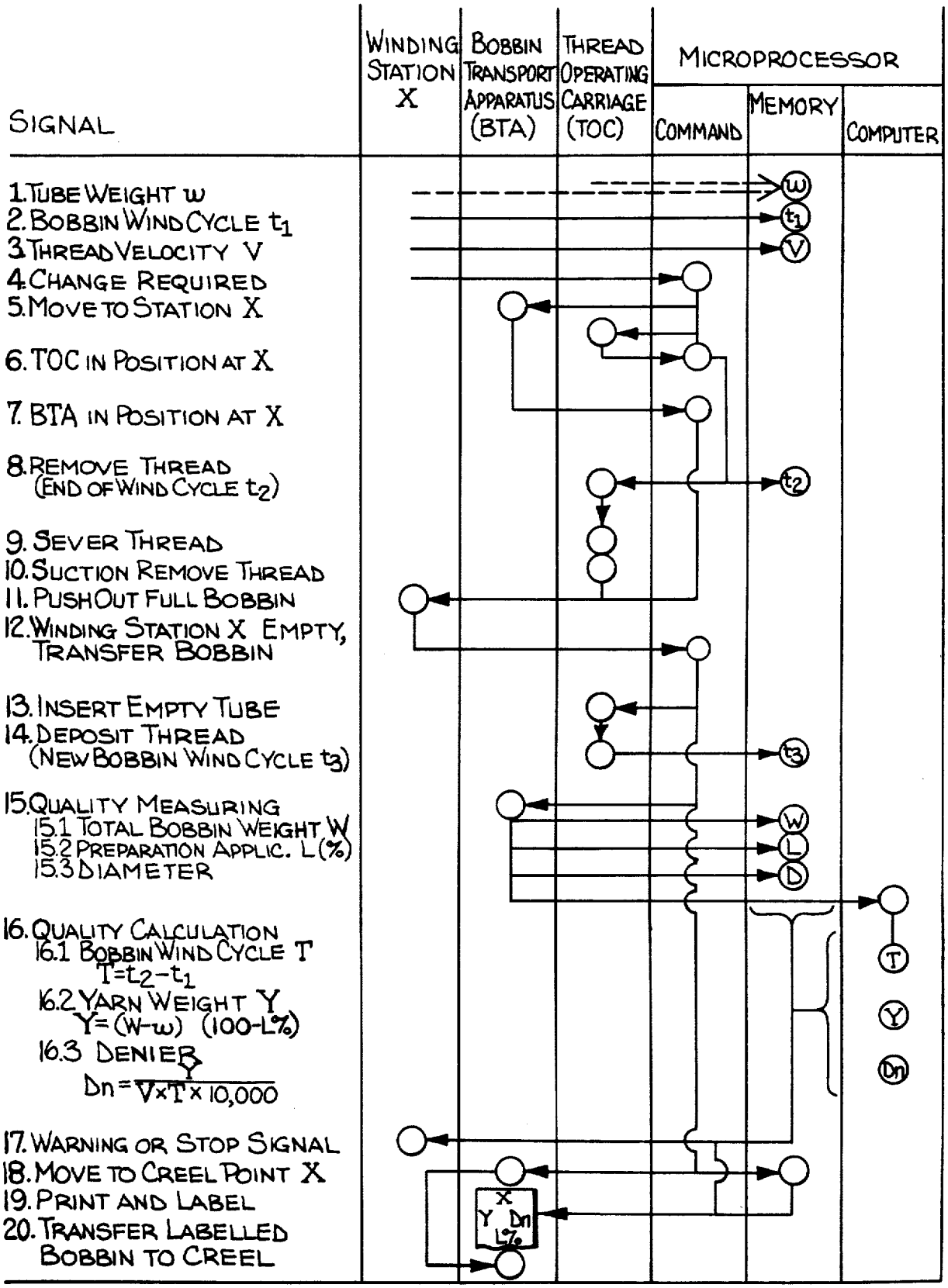
FIG. 8 is a coarse diagram illustrating the operation of the data processing unit in accordance with the present invention.

The start of the bobbin wind cycle is fed into the memory of the microprocessor at instant $t_1$, as signal 2 from each winding station, i.e. from the winding station indicated by X in the illustrated example of FIG. 8. Signal 3 contains the thread velocity, which is constant during the bobbin wind cycle in the production of synthetic fibers, and therefore may be fed in manually as a constant value.

Information as signal 4 is fed into the microprocessor from winding station X stating that it is necessary to change the bobbin. In order to activate this signal, each winding station may contain an operating time measuring device in which an operating time which has previously been experimentally determined is established. However, it is also possible to activate the signal 4, for example, by a diameter scanning device. The command to the bobbin transport apparatus (BTA) 31 and the thread operating carriage (TOC) 26 now follows as signal 5 from the microprocessor 22, to move to winding station X. Upon reaching position X (signals 6 and 7), the signal 8 is given to the thread operating carriage to "remove thread or threads" (which is simultaneously fed into the memory as a time signal $t_2$ for the operation of the bobbins wind cycle). Signal 9 "sever threads" and signal 10 "remove threads by suction" follow. The push-out device 42 of the winding station is now activated by signal 11, and the full bobbin package is pushed onto the bobbin transport apparatus. As a result of this, signal 12 is released, which in turn says that the winding station X is free to insert an empty tube and that the full bobbin has been transferred to the bobbin transport apparatus. By this signal 12, signals 13 and 14 are given to the thread operating carriage to mount the empty tubes on the winding head and to deposit the thread on the empty bobbins. Thereby, the instant $t_3$ for the start of a new bobbin wind cycle is simultaneously fed into the memory of the microprocessor. Further, by signal 12, signal 15 "quality measuring" is released to the bobbin transport apparatus. As previously described, the total weight of the bobbin W, the preparation application L, and the bobbin diameter D may thereby be measured. When the quality measuring has been effected, signal 16 (quality calculations) follows into the computer of the external microprocessor 22. In particular are calculated the duration of the bobbin wind cycle T as a difference of instant $t_2$-$t_1$ and the yarn weight Y as the difference between the total bobbin weight and the tube weight, corrected by a factor which constitutes the preparation application. The denier may also be calculated by the formula $$\text{Denier (Dn)} = Y\ (\text{Gram})/[V(\text{m/min}) \times T(\text{min}) \times 10{,}000$$

The results of the quality measuring and the calculations may now be directly given to the winding station X in the form of a warning or a stop signal 17, when these values differ inadmissibly from the preselected values or from averages which have been previously established by the microprocessor.

The quality measuring and quality calculations may be effected during the time in which the bobbin transport apparatus, triggered by signal 12, has just received the signal 18 for moving to the creeling place X. However, a signal 19 for printing on the bobbins may also be simultaneously released by the quality measuring and quality calculations. The winding station X on which the bobbin is produced, the yarn weight Y, the denier Dn, and the preparation application L % may particularly be included therein.

The command for transferring the thus characterized bobbin to a definite creeling pin takes place by signal 20. Thereby, it is possible to allocate each bobbin to the particular winding station at which it was processed.

In the drawings and specification, there has been set forth a preferred embodiment of the invention, and although specific terms are employed, they are used in a generic and descriptive sense only and not for purposes of limitation.

That which is claimed is:

1. A bobbin transport apparatus [adapted for use ] *in combination* with a textile yarn processing machine having a plurality of yarn winding stations aligned along at least one side thereof and with the winding stations each having a bobbin mounting means, said apparatus comprising a carriage adapted for movement along the side of the textile yarn processing machine, means mounted on said carriage for receiving and supporting a full bobbin from a bobbin mounting means of the textile yarn processing machine or the like, and measuring means mounted on said carriage for determining the weight of each bobbin while it is supported on said carriage.

2. The bobbin transport apparatus as defined in claim 1 wherein said measuring means further includes means for determining the diameter of each bobbin while it is supported on said carriage.

3. The bobbin transport apparatus as defined in claim 2 wherein said measuring means further includes means for determining the quantity of the liquid preparation on the yarn of each bobbin.

4. A bobbin transport apparatus [adapted for use] *in combination* with a textile yarn processing machine having a plurality of yarn winding stations aligned along at least one side thereof and with the winding stations each having a bobbin mounted means, said apparatus comprising a carriage adapted for movement along the side of the textile yarn processing machine, means mounted on said carriage for receiving and supporting a full bobbin from a bobbin mounting means of the textile yarn processing machine or the like, and measuring means mounted on said carriage for determining the diameter of each bobbin while it is supported on said carriage.

5. A bobbin transport apparatus [adapted for use] *in combination* with a textile yarn processing machine having a plurality of yarn winding stations aligned along at least one side thereof and with the winding stations each having a bobbin mounting means, said apparatus comprising a carriage adapted for movement along the side of the textile yarn processing machine, means mounted on said carriage for receiving and supporting a full bobbin from a bobbin mounting means of a textile yarn processing machine or the like, and measuring means mounted on said carriage for determining the quantity of the liquid preparation on the yarn of each bobbin while it is supported on said carriage.

6. The bobbin transport apparatus as defined in any one of [claim] *claims* 1–5 further comprising a printing apparatus mounted on said carriage and operatively connected to said measuring means for printing the output of said measuring means.

7. The bobbin transport apparatus as defined in claim 6 wherein said printing apparatus includes means for printing the output directly on each bobbin being measured and while it is supported on said carriage.

8. The bobbin transport apparatus as defined in any one of claims 1–5 further comprising a data processing unit operatively connected to the output of said measuring means, said data processing unit including a memory adapted for storing a preselected value for a selected physical characteristic of the bobbin, a program for calculating the selected physical characteristic of each bobbin from the output of said measuring means and comparing the calculated result with the preselected value, and means for generating a signal upon the calculated result differing from the preselected value by more than a predetermined amount.

9. The bobbin transport apparatus as defined in any one of claims 1–5 wherein said means for receiving and supporting a full bobbin comprises a mandrel having a length sufficient to receive and support at least two axially aligned bobbins.

10. The bobbin transport apparatus as defined in any one of claims 1–5 wherein said means for receiving and supporting a full bobbin comprises a mandrel, means mounting said mandrel to said carriage to permit said mandrel to be selectively oriented so as to be axially aligned with an elongate pin on an adjacent creel or the like, and means for axially ejecting a full bobbin from said mandrel so that it may be received on such pin.

11. A method for efficiently monitoring the quality of full bobbins produced on a yarn winding apparatus or the like *having a plurality of yarn winding stations*, and comprising the steps of

*moving a mobile bobbin transport apparatus to a position adjacent a yarn winding station of the yarn winding apparatus,* transferring a full bobbin from the winding apparatus onto supporting means mounted on [a] *the adjacent* mobile bobbin transport apparatus at the completion of the winding cycle of the winding [apparatus] *station* , measuring at least one quality control related physical characteristic of the full bobbin while it is positioned on said supporting means, generating an electrical output signal which is representative of each measured physical characteristic, and then removing each full bobbin from said supporting means for subsequent further handling or processing of the yarn thereon, *and*

*moving the bobbin transport apparatus to a position adjacent a different yarn winding station and repeating the above steps.*

12. The method as defined in claim 11 wherein the measuring step includes determining the weight of each bobbin, and the method includes the further steps of feeding the electrical output signal representing the measured weight to a computer, feeding the winding cycle time and winding velocity of the bobbin being measured into the computer, and operating the computer to calculate the denier of the yarn on the bobbin being measured.

13. The method as defined in claim 12 wherein the measuring step further includes determining the amount of the liquid preparation on the yarn on the full bobbin being measured, feeding an electrical output signal representative of the amount of preparation to the computer, and operating the computer to calculate the denier by a process which takes the amount of the liquid preparation on the yarn into account.

14. The method as defined in claim 13 comprising the further step of feeding the weight of the empty bobbin of the full bobbin being measured into the computer, and operating the computer to calculate the denier by a process which takes the weight of the empty bobbin into account.

15. The method as defined in claim 11 wherein the measuring step includes determining the weight and diameter of the full bobbin being measured, feeding the electrical output signals representative of the measured weight and diameter to a computer, and operating the computer to calculate the wind tightness of the full bobbin.

16. The method as defined in claim 11 comprising the further step of generating a process control signal [in the computer] when the electrical output signal indicates a departure in any measured physical characteristic from a control value by more than a predetermined tolerance range.

17. The method as defined in claim 11 comprising the further step of moving the bobbin transport apparatus to a remote location after the full bobbin has been transferred thereto, and wherein the measuring step is conducted at least in part during such movement.

*18. A movable quality control measuring apparatus in combination with a textile yarn processing machine having a plurality of yarn winding stations aligned along at least one side thereof and with the winding stations each having a bobbin mounting means, said apparatus comprising*

*a movable carriage adapted for movement to a position adjacent each winding station,*

*means mounted on said carriage for receiving and supporting a bobbin, and*

*measuring means mounted on said carriage for determining at least one quality control related physical characteristic of a support bobbin.*

*19. The movable quality control measuring apparatus as defined in claim 18 further comprising means mounted on said carriage for generating an electrical output signal which is representative of each measured physical characteristic.*

*20. A bobbin changing apparatus in combination with a textile yarn processing machine having a plurality of yarn winding stations aligned along at least one side thereof and with the winding stations each having a bobbin mounting means, said apparatus comprising*

*trackway means disposed along each side of said machine having winding stations thereon,*

*a carriage mounted for movement along said trackway means to a position adjacent each winding station,*

*means mounted on said carriage for receiving and supporting a bobbin from the bobbin mounting means of an adjacent winding station, and*

*measuring means mounted on said carriage for determining at least one quality control related physical characteristic of a support bobbin.*

*21. The bobbin changing apparatus as defined in claim 20 further comprising a creel disposed adjacent said trackway means and such that said carriage may be selectively moved to a position adjacent said creel, said creel including a plurality of rows of spaced projecting pins which are each adapted to receive and retain a full bobbin thereon, and mandrel means mounted on said carriage for depositing a full bobbin onto a selected one of said pins when said carriage is positioned adjacent said creel.*

*22. The bobbin changing apparatus as defined in claim 21 further comprising control means for selectively advancing said carriage along said trackway means to each winding station and said creel.*

*23. A method of doffing yarn bobbins from a textile yarn processing machine having a plurality of yarn winding stations aligned along at least one side thereof and while concurrently monitoring the quality of full bobbins produced on the yarn processing machine, and comprising the steps of*

*moving a mobile bobbin transport apparatus to a position adjacent a yarn winding station at the conclusion of the winding operation at such station,*

*transferring at least one full bobbin from the adjacent winding station onto said bobbin transport apparatus while said apparatus is adjacent such winding station,*

*measuring at least one quality control related physical characteristic of the full bobbin and generating an electrical output signal which is representative of each measured physical characteristic, while the full bobbin is positioned on said transport apparatus, then*

*removing each full bobbin from said transport apparatus for further handling or processing of the yarn thereon, and then*

*moving said transport apparatus to a position adjacent a different yarn winding station and repeating the above steps.*

*24. The method as defined in claim 23 wherein the step of removing each full bobbin from said transport apparatus includes moving said transport apparatus to a creel positioned adjacent said yarn processing machine, and depositing each full bobbin on said creel.*

*25. The method as defined in claim 23 or 24 wherein the measuring step includes determining the weight of each full bobbin.*

*26. The method as defined in claim 25 wherein the measuring step further includes measuring the winding cycle time and winding velocity of each full bobbin, and calculating the denier of the yarn on the bobbin from the equation:*

$$\text{denier} = \text{weight}/(\text{winding cycle time} \times \text{winding velocity}).$$

*27. The method as defined in claim 25 wherein the measuring step further includes measuring the diameter of each full bobbin.*

*28. The method as defined in claim 25 wherein the measuring step further includes measuring the quantity of the liquid preparation on the yarn of each full bobbin.*

*29. The method as defined in claim 23 or 24 comprising the further step of printing the output of said measuring means directly on each full bobbin while it is supported on said carriage.*

* * * * *

UNITED STATES PATENT AND TRADEMARK OFFICE

CERTIFICATE OF CORRECTION

PATENT NO. : Re. 31,839

DATED : February 26, 1985

INVENTOR(S) : Heinz Schippers; Gerd Muennekehoff; Udo Teich

It is certified that error appears in the above-identified patent and that said Letters Patent are hereby corrected as shown below:

Column 3, line 4, change "annd" to -- and --.

Column 5, line 41, after "carriage" insert -- 26 --.

Column 6, line 37, change "bobbin" to -- bobbins --.

Column 7, line 34, change "diamter" to -- diameter --.

Column 10, line 9, change "bobbins" to -- bobbin --.

Column 13, line 28, change "support" to -- supported --.

Column 13, line 48, change "support" to -- supported --.

Signed and Sealed this

*Twenty-third* Day of *July 1985*

[SEAL]

*Attest:*

DONALD J. QUIGG

*Attesting Officer*

*Acting Commissioner of Patents and Trademarks*